July 21, 1936.   A. E. COOK   2,048,181
AUTOMARINE VEHICLE
Filed April 23, 1934   7 Sheets-Sheet 4
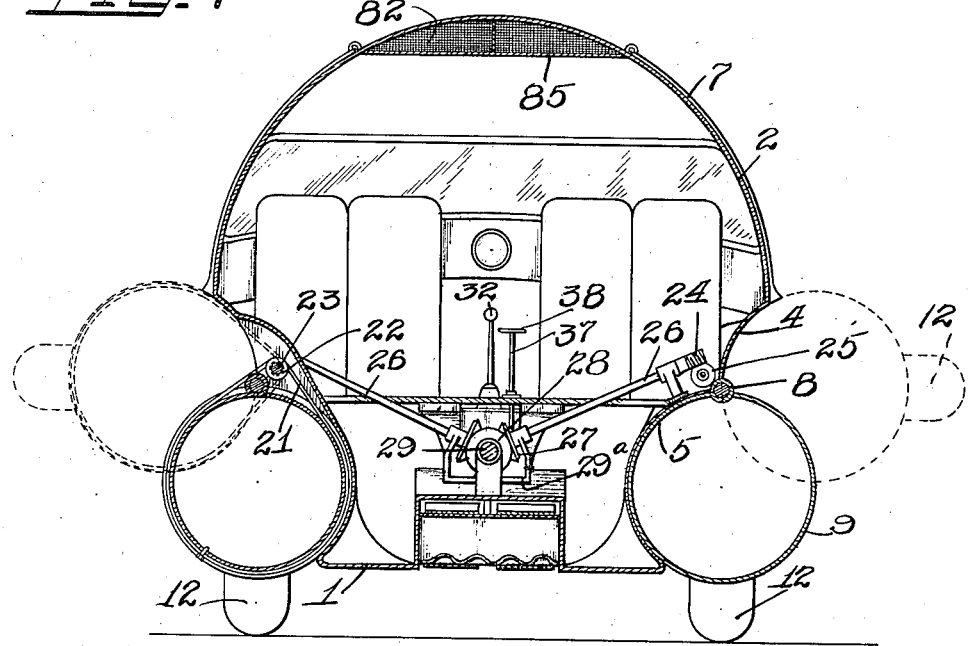
Fig. 7
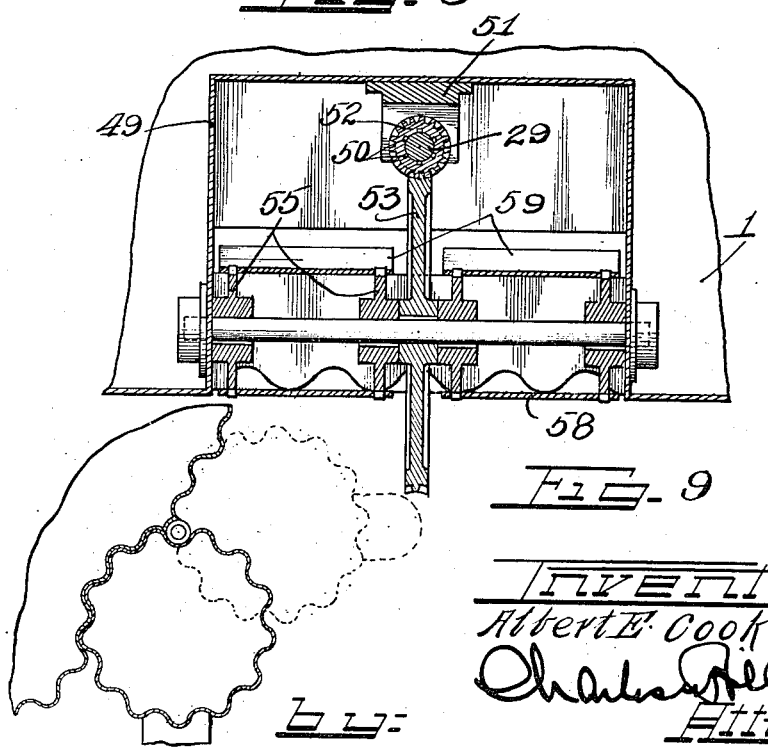
Fig. 8
Fig. 9
Inventor
Albert E. Cook.
by Charles Allen
Attys.

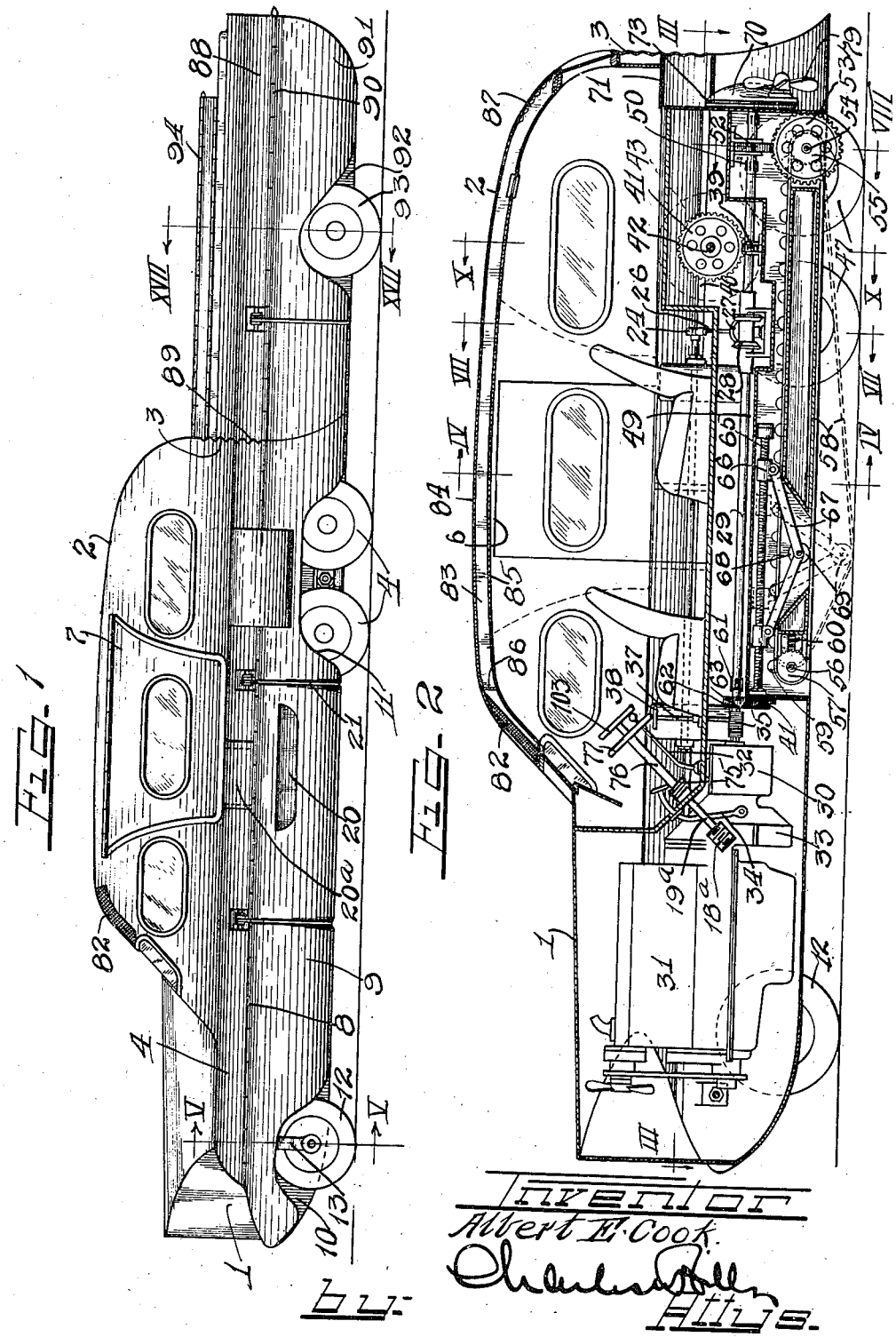

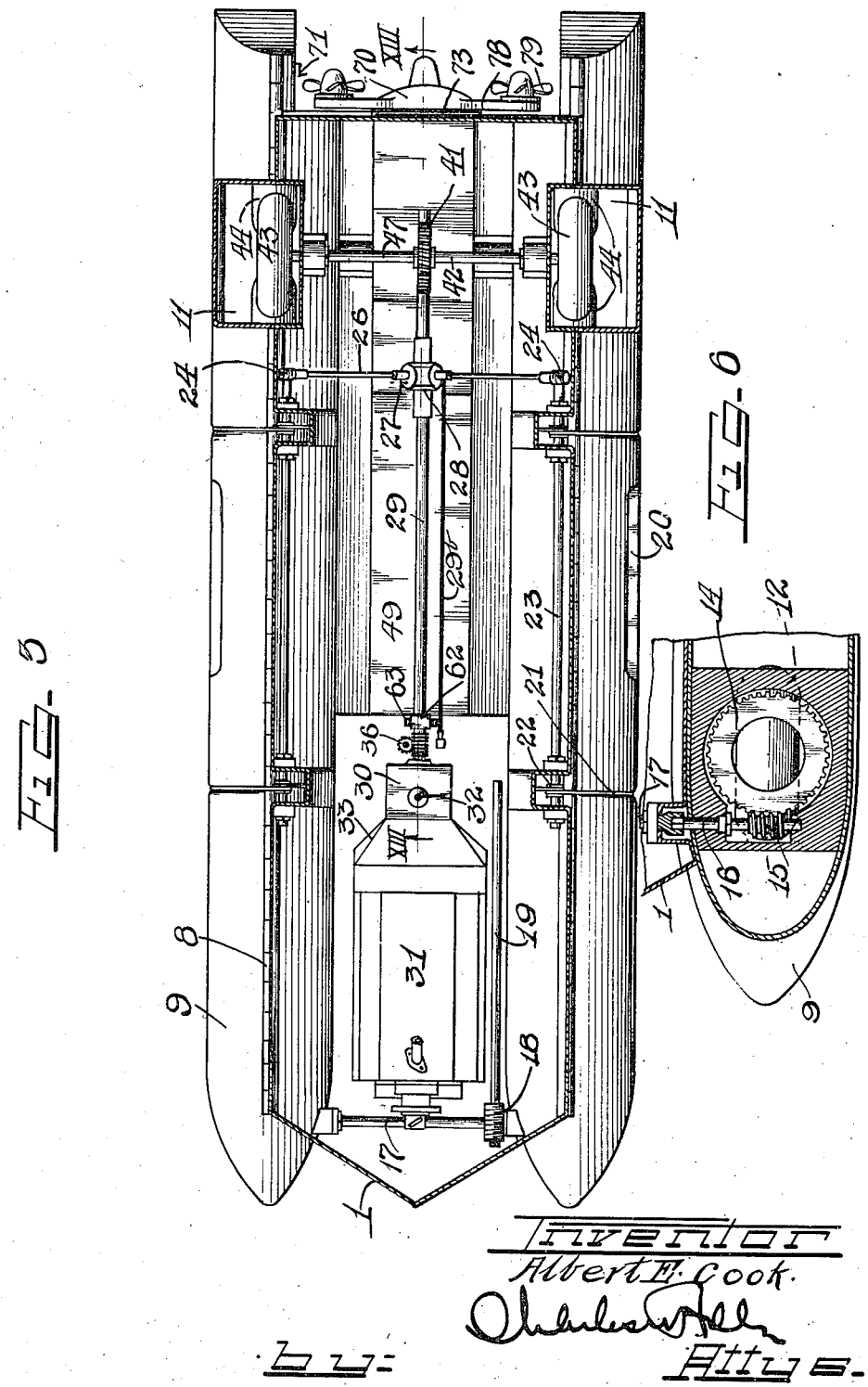

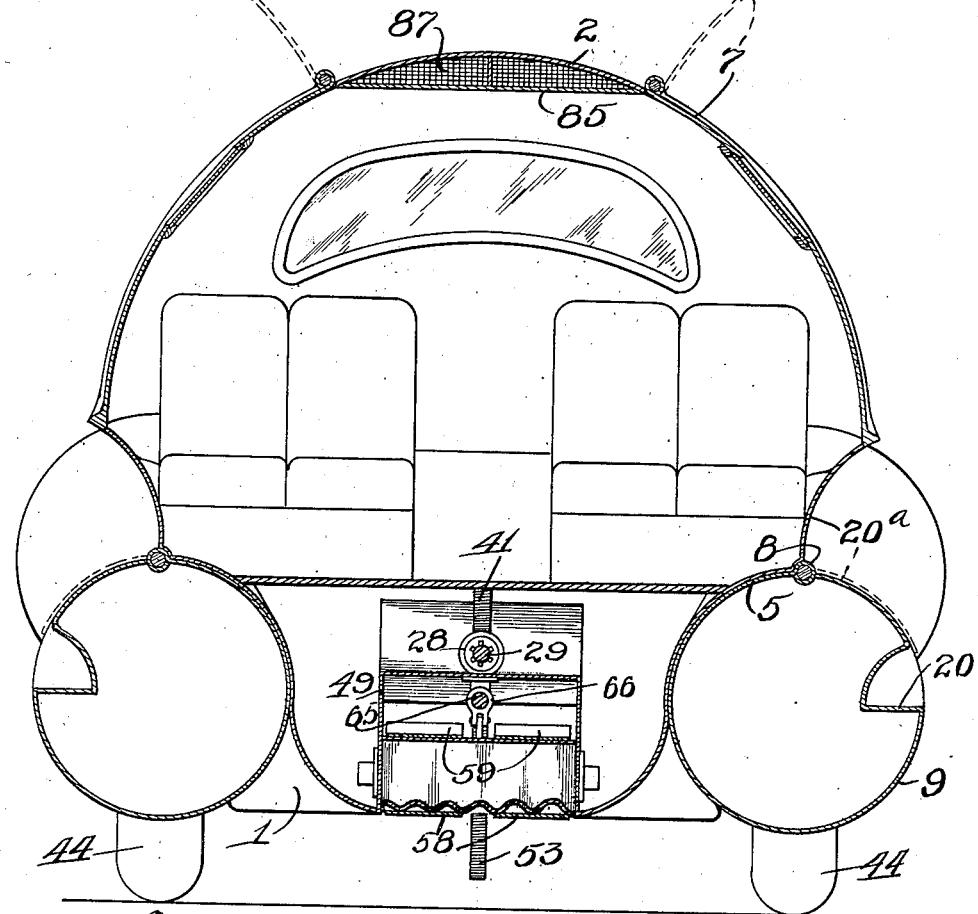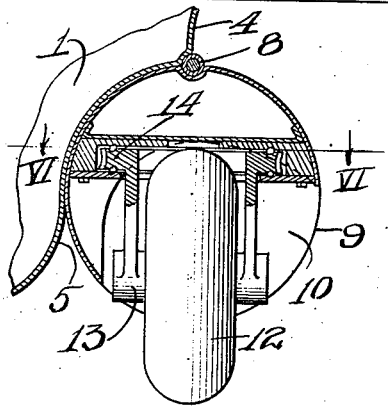

July 21, 1936.  A. E. COOK  2,048,181
AUTOMARINE VEHICLE
Filed April 23, 1934   7 Sheets-Sheet 5
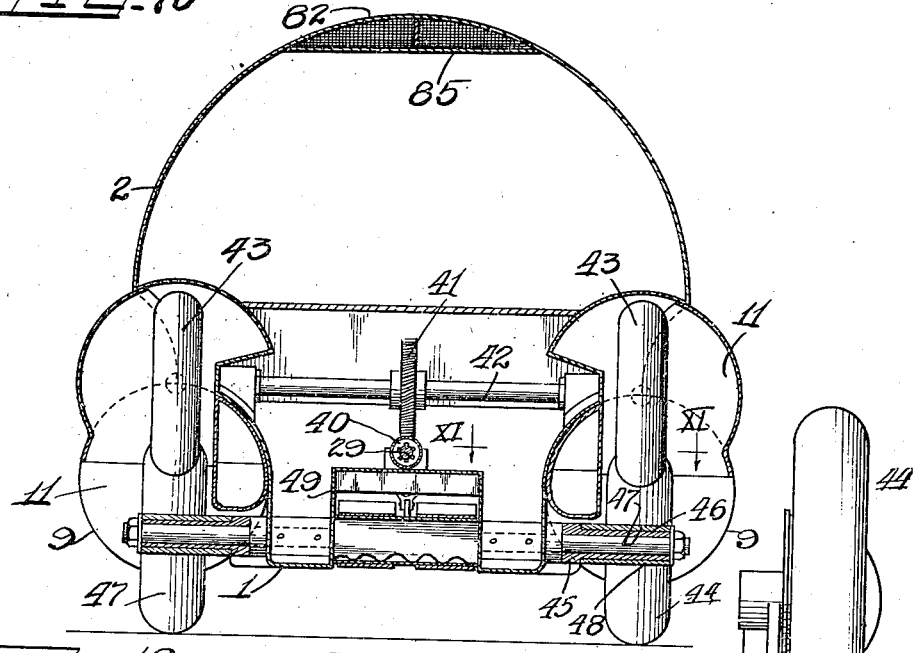
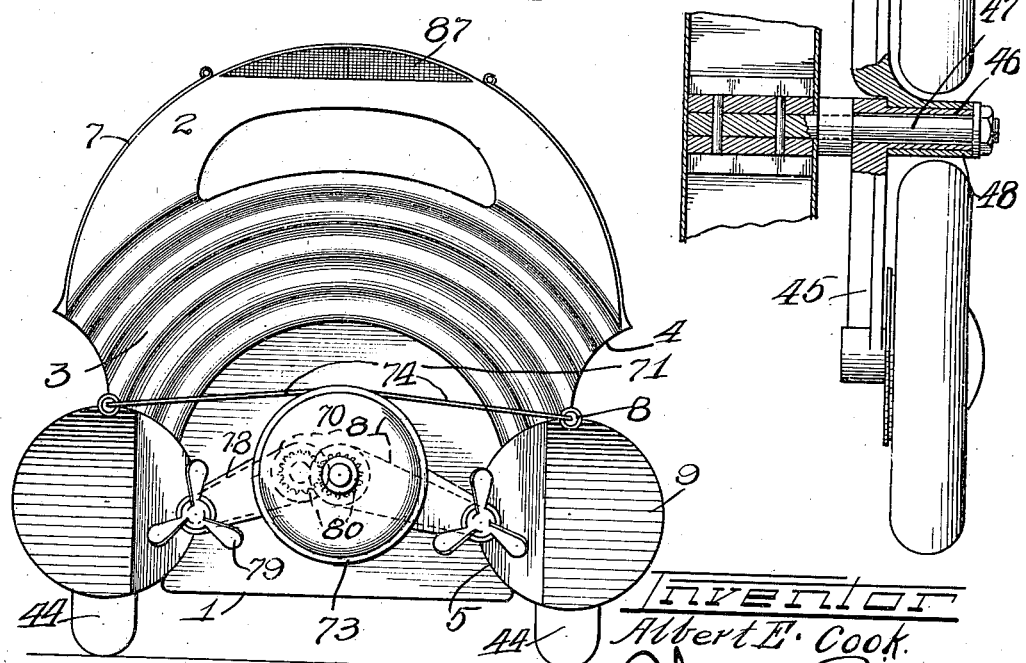
Inventor
Albert E. Cook.
by Charles W. Kelly
Attys.

July 21, 1936.  A. E. COOK  2,048,181
AUTOMARINE VEHICLE
Filed April 23, 1934  7 Sheets-Sheet 6
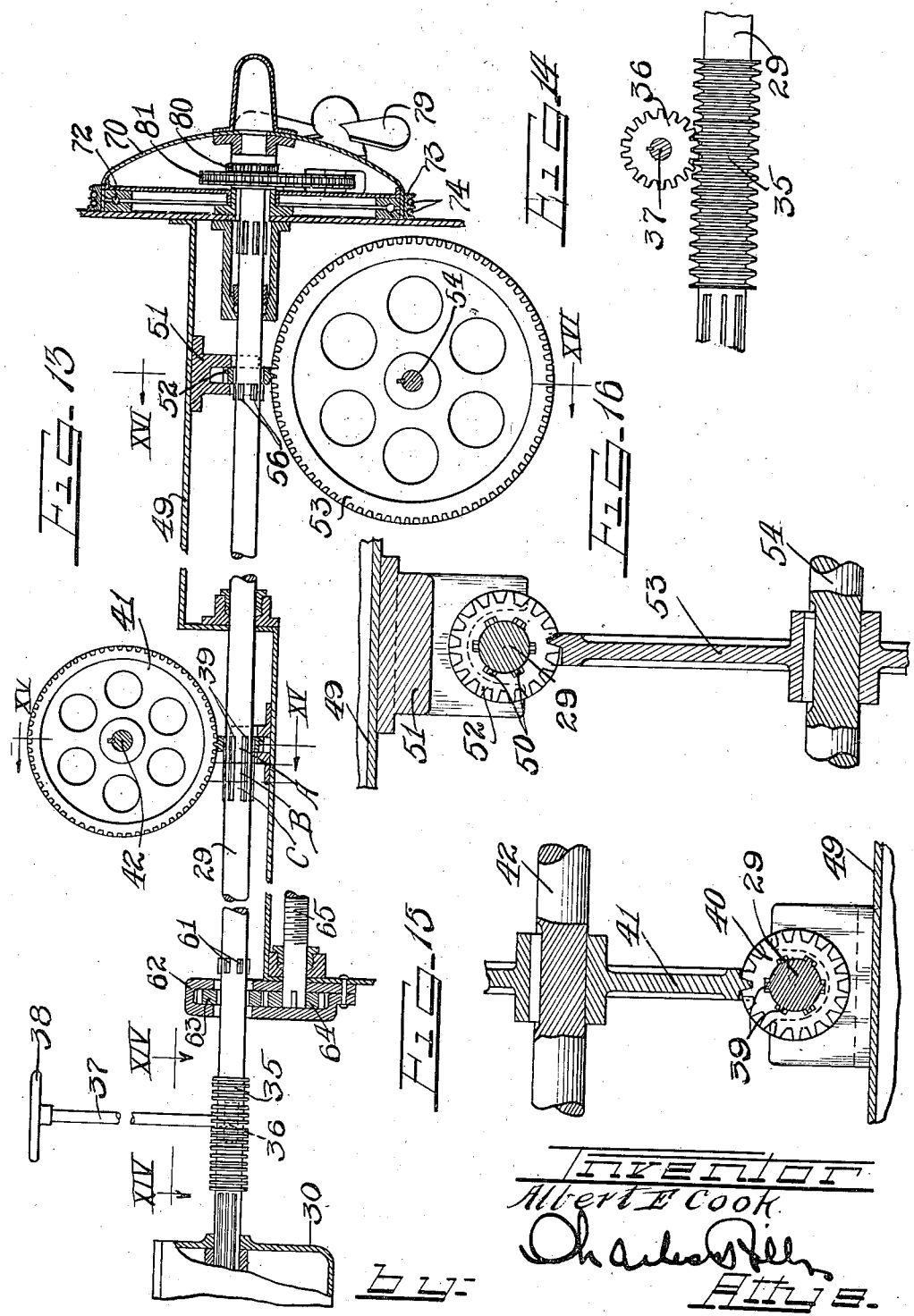

July 21, 1936.                    A. E. COOK                    2,048,181
                             AUTOMARINE VEHICLE
                          Filed April 23, 1934              7 Sheets-Sheet 7
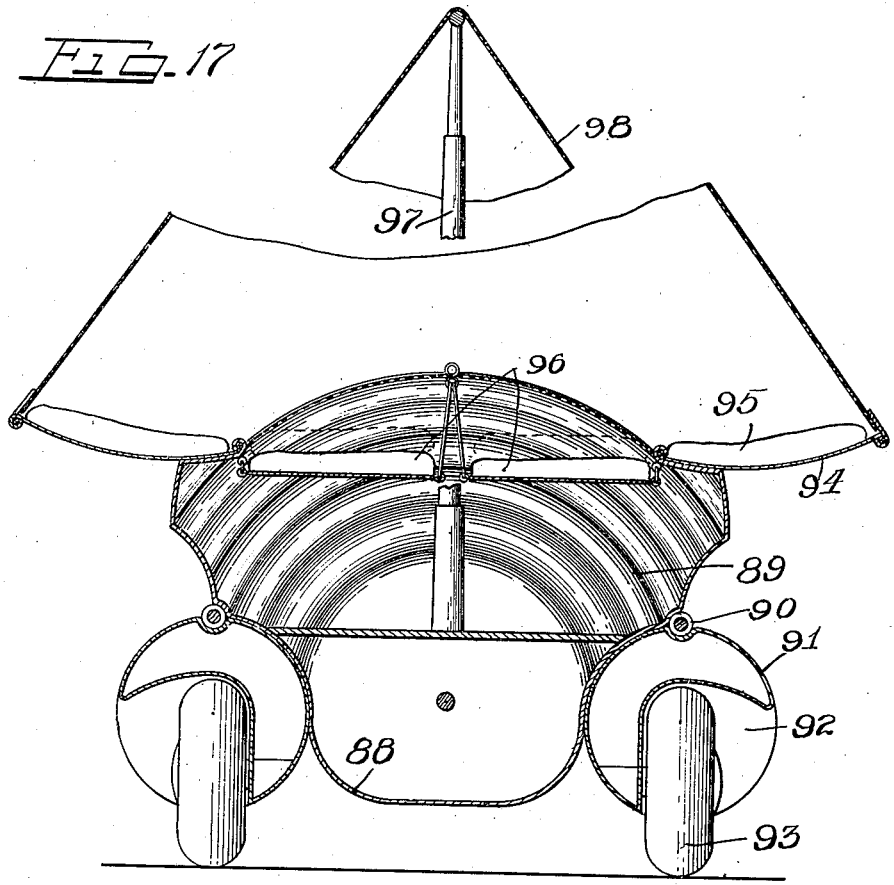
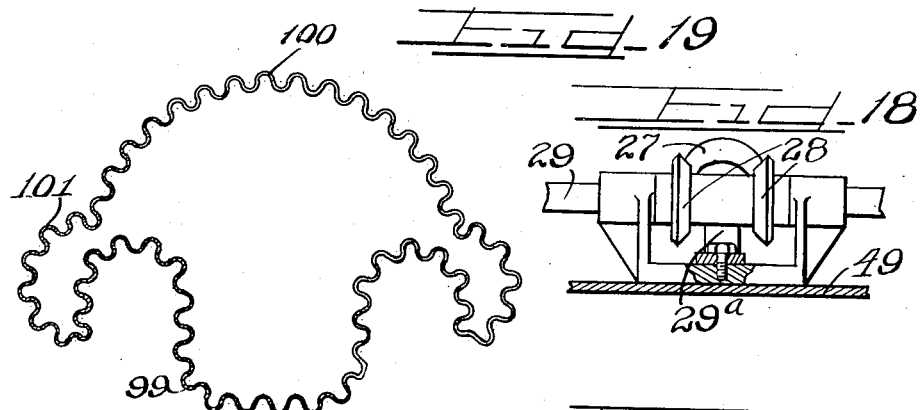
Inventor
Albert E. Cook.
by Charles Allen
Attys.

Patented July 21, 1936

2,048,181

UNITED STATES PATENT OFFICE 2,048,181

AUTOMARINE VEHICLE

Albert E. Cook, Evanston, Ill.

Application April 23, 1934, Serial No. 721,896

19 Claims. (Cl. 115—1)

The present invention covers improvements in a combination land and water vehicle including a trailer section adapted to be positioned in interfitting relation with the rear end of the vehicle body to form a continuous part of the vehicle when used as an automobile or a continuous part of the body or hull of the device when the same is used as a water craft.

The improved vehicle also includes in combination a main driving shaft operated from the motor and being mounted so that the same may be shifted longitudinally in opposite directions into a plurality of different driving positions to drive the vehicle on land or in water, to adjust or set "caterpillar" jacking means, and to adjust the wheel carrying pontoons of the vehicle into raised or lowered positions; said shaft being furthermore adjustable into a position to cause a drive to be transmitted to the "caterpillar" means when it is intended to drive the vehicle over rough or soft ground, or from the land into the water or from the water onto the land.

It is an object of this invention to provide a combination automarine vehicle having an adjustable driving shaft operable from the motor and adjustable for selectively imparting a drive to driving wheels, propellers or "caterpillar" driving and jacking means and to combinations of said driving means.

It is also an object of this invention to provide an improved type of combination land and water vehicle including a trailer unit and having a plurality of different driving mechanisms adapted to be selectively connected up with the driving motor of the vehicle by means of a manually controlled adjustable transmission shaft operable through a control device positioned at the driver's station of the vehicle.

It is a further object of this invention to provide an improved type of automarine vehicle including a plurality of driving mechanisms which can be brought into operation through the adjustment of a transmission shaft which is also adjustable into a position for moving "caterpillar" driving mechanism either into a jacking and driving position or back into a position out of use when the pontoons are in a lowered position.

Another object of the present invention is the provision of a combination land and water vehicle including a trailer unit having a corrugated body portion adapted to be positioned to interfit with a corrugated portion of the body of the vehicle to form a continuous vehicle unit which may be used on either land or in the water with the proper adjustment of wheel carrying pontoons forming part of the vehicle proper and the trailer unit.

It is furthermore an object of this invention to provide an improved type of automarine vehicle wherein the driving wheels are elevated above the ground and are in frictional driving contact with traction wheels to serve as a cushioning means for the vehicle to promote smooth easy riding.

Another object is to provide a land and water vehicle wherein draft varying pontoons are adjustably mounted on the side of the vehicle body and are provided with groups of frictionally contacting pneumatic wheels for use in driving the vehicle when used on land.

Another object of the invention is to provide a land and water vehicle including a trailer adapted to be connected with the vehicle when used on land and furthermore adapted to be rigidly connected to interfit with the rear end of the vehicle when used as a water craft to increase the over-all length of the same.

It is also an object of this invention to provide a land and water vehicle wherein the body has pontoons adjustably supported thereon carrying steering wheels and frictionally driven traction driving wheels and with said steering wheels and the friction-driven traction wheels controlled and operated from the interior of the vehicle body, said vehicle also having means therein whereby the pontoons may be moved into different positions for the purpose of varying the draft of the vehicle when used as a water craft.

A further object of the invention is the provision of an automarine vehicle including a land driving mechanism and a pivotally supported water driving mechanism, said water driving mechanism being controlled from the driver's position and adjustable for steering the vehicle in the water.

Still another object of the invention is the provision of an automarine vehicle having a "caterpillar" driving means operable from the transmission shaft to serve both as a jacking means and a driving means for the vehicle.

It is also an object of the present invention to provide a land and water vehicle wherein the body is constructed with a radiator in the upper front portion of the body top, to serve as a cooling medium for the water cooling system of the engine, and also acting as a means for heating the interior of the body from air chambers in the body walls by means of fans or blowers; said air chambers also adapted to serve as a cooling means in warm weather.

Another object of the invention is the provision of a caterpillar jacking and driving unit so positioned that when the same is in lowered position a portion thereof is centrally located to serve as a perfect balance whereby the vehicle may be tipped forwardly or rearwardly and also permitting either of the pontoons to be raised to afford convenient access to the vehicle wheels.

A further object of the invention is the construction of an automarine vehicle having adjustable wheel carrying pontoons, which when in raised position, so position the wheel tires to permit the same to serve as resilient bumpers when making landings.

Still another object of the invention is to provide a combination land and water vehicle with endless traction units adapted to be selectively connected with the power unit of the vehicle for the purpose of jacking up the vehicle and then driving the same over unpassable or rough places or for driving the vehicle into the water or out of the same during the conversion of the vehicle into either a water craft or a land vehicle.

It is an important object of this invention to provide an improved type of land and water vehicle including a trailer unit for use as an extension for the vehicle on either land or in the water, said vehicle having a plurality of driving mechanisms, all of which are adapted to be connected with a source of driving power by means of a manually controlled adjustable transmission shaft which may be selectively adjusted for connecting up any one of the driving mechanisms in addition to being adjustable into position for the purpose of properly positioning one of the driving mechanisms for use, or for connecting up with control mechanisms whereby adjustable pontoons forming part of the vehicle may be raised or lowered as desired.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of an improved combination land and water vehicle and trailer embodying the principles of this invention.

Figure 2 is a longitudinal vertical section of the land and water vehicle with the trailer omitted and with parts shown in elevation.

Figure 3 is a horizontal sectional view of the vehicle taken on line III—III of Figure 2 with parts shown in elevation and with parts omitted.

Figure 4 is an enlarged transverse vertical sectional view taken on line IV—IV of Figure 2 and showing the operation of the side doors in dotted lines.

Figure 5 is an enlarged vertical detail section taken on line V—V of Figure 1 with parts shown in elevation and with parts broken away.

Figure 6 is a horizontal detail sectional view taken on line VI—VI of Figure 5 with parts shown in elevation and with parts broken away.

Figure 7 is a transverse vertical detail sectional view taken on line VII—VII of Figure 2 and illustrates the pontoon adjusting mechanism.

Figure 8 is an enlarged fragmentary vertical detail section taken on line VIII—VIII of Figure 2 with parts shown in elevation and illustrating the detail arrangement of the "caterpillar" belt driving mechanism.

Figure 9 is a fragmentary vertical detail section through a modified form of body and pontoon constructed of corrugated metal to permit interfitting of the corrugated pontoons with the corrugated body wall, and further illustrating the raised position of the pontoons in dotted lines.

Figure 10 is a vertical transverse detail section taken on line X—X of Figure 2 with parts shown in elevation and more clearly illustrating the frictional driving contacts of the upper driving wheels with the traction wheels.

Figure 11 is an enlarged fragmentary horizontal sectional view taken on line XI—XI of Figure 10 with parts shown in elevation and with parts broken away and omitted.

Figure 12 is a rear elevational view of the land and water vehicle with the trailer omitted.

Figure 13 is an enlarged fragmentary longitudinal detail section taken on line XIII—XIII of Figure 3, illustrating the detail construction of the transmission shaft and the mechanisms whereby the various driving units for the vehicle may be connected to receive a drive from the power unit of the machine.

Figure 14 is an enlarged fragmentary detail section taken on line XIV—XIV of Figure 13 illustrating the mechanism whereby the transmission shaft may be longitudinally shifted.

Figure 15 is a vertical detail section with parts shown in elevation taken on line XV—XV of Figure 13 illustrating the mechanism for imparting a drive to the rear driving wheels of the vehicle.

Figure 16 is an enlarged vertical detail section taken on line XVI—XVI of Figure 13 with parts shown in elevation and illustrating the mechanism whereby a drive is imparted from the driving shaft to the "caterpillar" mechanisms of the machine.

Figure 17 is a vertical transverse detail sectional view of the device taken on line XVII—XVII of figure 1 illustrating the top closure panels of the trailer in open position and furthermore illustrating the extended broken-away position of the telescoping tent pole or mast for supporting a tent-like covering in position over the top of the open trailer.

Figure 18 is a fragmentary detail view of the friction drive mechanism for adjusting the pontoons.

Figure 19 is a transverse section of a modified form of vehicle body having stationary pontoons formed thereon.

As shown on the drawings:

The combination land and water vehicle with trailer is shown in Figure 1 in assembled relation for use as a land vehicle. The reference character 1 indicates the main body or hull of an automarine vehicle, said body or hull being provided with a top section 2 of a closed construction having the rear wall thereof extending downwardly to merge with the rear wall of the body and having a corrugated rear panel 3 formed therein. The sides of the main body 1 of the vehicle are shaped to afford upper pontoon recesses or pockets 4 and lower recesses or pontoon pockets 5 as clearly illustrated in Figure 4. The pockets of the top section are provided with door openings 6 (Figure 2) which are closed by means of side doors 7 hingedly supported along their upper edges or ends to the top section.

Pivotally mounted on each side of the body 1 of the vehicle by means of a hinge section 8 is a side pontoon 9, each of which has a front wheel carrying pocket 10 and a rear wheel compartment 11. Positioned in each of the front wheel openings 10 of the pontoon is a front steering wheel 12 supported on a suitable stub shaft engaged in a supporting and steering bracket 13. Formed on the upper end of the steering bracket 13 is a worm wheel 14 which is in mesh with a control worm 15. The worm 15 is supported on a front shaft or axle section 16 as illustrated in Figure 6. The shaft sections 16 have the inner ends thereof squared and removably projecting into the recessed ends of a front steering shaft 17 which is operable by means of a steering worm 18 (Figure 3) mounted on the front end of a connecting shaft 19. The rear end of the shaft 19 is equipped with a worm wheel operable by a worm 18a on the steering post 19a.

As clearly illustrated in Figures 3 and 4 each of the main pontoons 9 is provided with a side recess affording a step 20 to facilitate entering or leaving of the vehicle body by a driver or passenger. A lower hinged door 20a is provided in each of the pontoon pocket walls 4 and can be swung downwardly into the open dotted line position of Figure 4 to permit a person to conveniently step onto the floor of the vehicle.

When the pontoons are raised the lower doors 20a are closed and a person has merely to step over the same when the vehicle is used as a water craft.

The main pontoons 9 are mounted to permit the same to be swung from the lowered normal positions illustrated in Figure 7 into the raised dotted line positions by means of endless cables or belts 21 engaged around the pontoons and also engaged around pulley members 22 supported on shafts 23 mounted longitudinally within the body 1. The pontoon control shafts 23 are connected by means of worms 24 and worm-wheels 25 to transversely disposed inclined shafts 26 (Figure 7) journalled in suitable bearings disposed within the body of the vehicle. Mounted on the lower end of the inclined shafts 26 are beveled friction disks or wheels 27 which are in frictional contact with friction driving disks or wheels 28 secured on the main transmission shaft 29 of the vehicle.

As illustrated in detail (Figure 18) the lower ends of the shafts 26 are journalled in a U-shaped bearing bracket 29a which is pivotally supported to permit the same to be slightly rotated to move the respective pontoon operating friction disks or wheels 27 alternately into frictional contact with either of the friction wheels 28 to rotate the shafts 26 and the shafts 23 in one direction or the other to cause either raising or lowering of the pontoons 9.

The operation of the pivoted bracket 29a is accomplished by means of a rod or shaft 29b (Figure 3) having the front end connected with a control lever or foot pedal at the driver's position of the vehicle. When the control lever is in neutral position the friction wheels 27 are out of contact with both of the friction driving wheels 28, thereby leaving the pontoons 9 in either their upper or lower positions.

The main transmission shaft 29 is mounted substantially centrally and longitudinally of the vehicle body and is mounted to be shifted longitudinally into a plurality of different control positions for operating different mechanisms of the vehicle. The front end of the transmission shaft 29 is connected with the gear transmission mechanism 30 which in turn is adapted to be operated from the power unit or engine 31 of the vehicle. The gear shift or transmission mechanism 30 is operable by means of a gear shift lever 32. Disposed between the engine 31 and the transmission 30 is a clutch mechanism 33 having a clutch pedal control device 34 connected therewith.

Mounted or secured on the front portion of the transmission shaft 29 is a circular rack 35 to permit longitudinal shifting of the transmission shaft by means of a gear 36 which is in mesh with the rack. The gear 36 is mounted on a shaft adjustment control post 37 located in a convenient place at the driver's station of the vehicle. A hand wheel 38 is engaged on the upper end of the control post 37 to permit convenient rotation of the gear 36 to cause shifting of the transmission shaft 29 into any one of a plurality of selected positions for the purpose of connecting up any one of a plurality of driving and adjusting mechanisms with the engine of the vehicle.

The driving mechanisms for driving the vehicle when used as a land device will now be described. Secured around a selected portion of the transmission shaft 29 are a plurality of longitudinally positioned projections or keys 39 which form the main drive control and with the shifting of the transmission shaft 29 into a predetermined position the keys 39 are slidably moved into locking engagement with a pinion or driving gear 40 which is mounted in a suitable position to permit the transmission shaft 29 to project therethrough as clearly illustrated in Figures 13 and 15. The keys 39 are divided into three sections A, B, and C, to permit the same to be selectively moved into driving engagement with the driving pinion 40. A large spiral driving gear 41 is in mesh with the pinion 40. The gear 41 is secured on an upper auxiliary driving shaft 42 disposed transversely of the vehicle and supported in suitable bearing brackets as clearly illustrated in Figure 10.

The upper auxiliary driving shaft 42 projects outwardly from the interior of the vehicle into the driving wheel compartment or recesses 11 and has pneumatic tired rear driving wheels 43 mounted thereon.

The pneumatic tires of the rear or main driving wheels 43 are supported in running frictional contact with a plurality of rear traction wheels 44 which are also equipped with pneumatic tires. As clearly illustrated in Figures 1 and 3, there are two rear traction wheels 44 positioned on each side of the vehicle within each pontoon compartment or recess 11 for supporting one of the elevated or raised rear driving wheels 43. As illustrated in Figure 11, each of the rear traction wheels 44 is rotatably supported on a swinging bracket 45. One of the brackets 45 is provided with a bearing sleeve 46 which is supported on the outer end of a traction shaft 47 supported in suitable bearings or brackets on the chassis of the vehicle. The second wheel supporting bracket 45 is provided with a sleeve 48 which rotatably fits over the sleeve 46 of the first mentioned bracket.

From the drawings and description of the improved vehicle, it is to be noted that the vehicle proper when used as a land vehicle has the main pontoons 9 positoned in their lowermost position supported by means of the front steering wheels 12 and the rear traction wheels 44. With the vehicle driving wheels 43 positioned above the traction surface and frictionally engaging the pneumatic rubber tires of the pneumatic traction wheels 44, shocks, stresses and strains resulting from driving the vehicle over a road are received by the traction wheels 44 and are reduced and absorbed by the tires of the traction wheels and the tires of the driving wheel 43 to such an extent that very little of the strains and shocks are transmitted to the vehicle frame and body. This absorption of the shocks and strains by the tires of the wheels 43 and 44 eliminates the need of the ordinary rear vehicle springs. The pivotally arranged supports for the traction wheels 44 permits adjustment of the traction wheels to compensate for wear on the tires and furthermore affords an arrangement permitting convenient travel of the traction wheels over obstructions in the road or depressions therein.

In addition to driving the combination vehicle by means of the traction wheels 44 and the driving wheels 43, in combination with the front steering wheels 12, the vehicle is equipped with a caterpillar traction mechanism which normally is positioned in a raised out-of-the-way position. As illustrated in Figures 2 and 13, the caterpillar driving mechanisms are mounted within a housing 49 disposed centrally in the lower rear portion of the vehicle housing. The main transmission shaft 29 projects into a raised rear portion of the housing 49 and has a plurality of caterpillar drive control keys 50 secured circumferentially thereon with the individual keys disposed longitudinally of the transmission shaft as clearly illustrated in Figure 13. Engaged in a supporting bracket 51 mounted in the housing 49 is a drive transmitting spiral gear or pinion 52 in the form of a ring and having longitudinal slots provided in the inner periphery thereof for the reception of the keys 50 when the transmission shaft 29 is shifted a selected amount. The transmission shaft 29 projects through the pinion 52.

Meshing with the spiral pinion 52 is a large spiral gear 53 keyed on a rear "caterpillar" driving shaft 54. The shaft 54 is journalled in suitable bearings fixed on the side walls of the housing 49 as illustrated in Figure 8. Keyed on the shaft 54 on opposite sides of the spiral gear 53 are pairs of sprocket wheels 55. A front "caterpillar" shaft 56 is provided in the front portion of the housing 49 and has pairs of sprocket wheels 57 mounted thereon. Trained around the respective pairs of rear sprocket wheels 55 and the front sprocket wheels 57 are two endless belts 58 having traction cleats or shoes 59 secured at spaced intervals thereon. The margins of the belts 58 are perforated to receive the teeth of the sprocket wheels 55 and 57.

The front shaft 56 of the "caterpillar" driving belt has the ends thereof mounted in guide grooves and is normally held by means of springs 60 (Figure 2) in a forward position for holding both the lower and upper laps of the belts in substantially parallel relation out of use.

For the purpose of bringing the lower laps of the "caterpillar" driving belts 58 into a jacking or tracking position as illustrated in dotted lines in Figure 2 for the purpose of either jacking up the vehicle on land or for driving the vehicle from the water upwardly onto a bank when the side pontoons 9 are either in their raised or lowered positions, a special adjustment mechanism is provided in the vehicle which is adapted to be driven from the transmission shaft 29. The adjusting mechanism for the "caterpillar" belts consists of a plurality of longitudinally disposed control keys 61 secured around a forward section of the transmission shaft 29. Mounted on the front end of the "caterpillar" housing 49, as clearly illustrated in Figure 13, is a small housing 62 through which the shaft 29 projects. Disposed in the housing 62 and engaged around the shaft 29 is a ring gear 63 having slots provided longitudinally in the inner peripheral surface thereof for the reception of the keys 61 when the shaft 29 is shifted to move said keys into the housing 62. Also mounted within the housing 62 and meshing with the upper ring gear 63 is a lower gear 64. The gear 64 is keyed on the front end of a right and left threaded screw shaft 65 which is mounted within the housing 49 as illustrated in Figure 2. Engaged on the screw shaft 65 are internally threaded collars or sleeves 66 to which the upper ends of a pair of links or arms 67 are pivotally attached. The lower ends of the links 67 support a shaft 68 on which rollers or drums 69 are supported. The rollers 69 are positioned against the inner surfaces of the lower laps of the "caterpillar" belts 58 so that when the transmission shaft 29 is shifted forwardly to engage the keys 61 in the gear 63, the screw shaft 65 is rotated thereby causing the two sleeves 66 to move inwardly toward one another so that the rollers 69 are moved from the full line position of Figure 2 into the dotted line position to deflect the lower laps of the "caterpillar" belts into contact with the ground. With the lowering of the lower lap of the "caterpillar" belt the front shaft 66 of the caterpillar mechanism is pulled rearwardly against the action of the springs 60. The rollers 69 may be lowered farther, thereby causing the "caterpillar" mechanisms to act as a jack. With the movement of the "caterpillar" belts into traction engagement with the ground the vehicle is adapted to be driven over soft ground or over rough or inclined surfaces until a suitable position is reached wherein the pontoon wheels will properly take hold or track. When this condition is reached, the traction belts are no longer needed and the same may be returned to their normal positions by causing the screw shaft 65 to be rotated in a reverse direction to separate the collars 66 and thereby raise the rollers 69. With the retraction of the rollers 69 the springs 60 serve to move the "caterpillar" shaft 56 forwardly to pull the lower laps of the traction belts 58 upwardly into retracted normal position.

When it is desired to use the vehicle as a water craft, the vehicle is driven into the water and by suitable shifting of the bracket 29a by means of the rod 29b, the beveled disks 27 are moved into frictional contact with the respective beveled driving disks 28 to cause operation of the shafts 26 and the cables 21. The pontoons 9 are thus moved from the lower positions illustrated in Figure 7 into the upper dotted line positions to convert the vehicle into a water craft. In the raised positions of the pontoons the rubber tires of the wheels 12 and 44 are positioned to serve as bumpers for the craft.

With the vehicle converted into a water craft and with the pontoons 9 in their raised position to increase the draft, the craft may be driven in the water by driving mechanisms which will now be described.

The rear portion of the transmission shaft 29 projects through an opening in the rear wall of the vehicle body into a gear housing 70 which projects into a rear propeller recess 71 provided in the lower rear end of the vehicle. As clearly illustrated in Figure 13, the gear housing 70 is rotatably supported on the rear of the automobile body by means of a ball bearing mechanism 72.

Secured on the exterior of the gear housing 70 is a grooved pulley rim 73 around which a control or operating cable 74 is engaged. The cable as it leaves the upper portion of the pulley 73 projects in opposite directions as illustrated in Figure 12 and continues forwardly on opposite sides of the vehicle through the hinge members 8. At points opposite the driver's position the ends of the cable project inwardly through openings in the hinge members 8 and has the ends thereof connected to a spirally grooved pulley 75 (Figure 2) which is secured on the lower end of an auxiliary or outer control post 76 through which the steering post 19a projects.

Secured on the upper end of the control post 76 is a water craft steering wheel 77 which as clearly illustrated in Figure 2 is disposed a short distance below the regular steering wheel 103 of the vehicle.

Rigidly formed or secured on each side of the gear housing 70 is a housing arm 78 having a propeller shaft journalled in the outer end thereof. Secured on the outer projecting end of each propeller shaft is a propeller 79. Secured on the rear portion of the main transmission shaft 29 within the gear housing 70 is a gear 80 which meshes with a second gear 80 on a stub shaft supported adjacent the rear end of the shaft 29 (Figure 12). The propeller driving chains 81 extend through the housing arms 78 and have the outer bight portions thereof engaged around small gears secured on the inner ends of the propeller shafts. The upper bights of the chains 81 are trained around sprocket wheels mounted adjacent the gears 80.

As clearly illustrated in Figures 1 and 2 attention is called to the novel arrangement whereby the water from the water cooling system of the vehicle engine is conducted upwardly from the engine to a water cooling radiator 82 positioned in the upper front portion of the front wall of the vehicle top. The radiator 82 is provided in the front end of an air circulating chamber 83 which is formed between the vehicle top wall 84 and an inner top wall 85 and extends down into the side and rear walls of the vehicle body. Disposed within the front portion of the air chamber 83 directly to the rear of the front radiator 82 is a control apron or flap 86 which is constructed to permit the same to be opened and closed from the driver's position of the vehicle. This may be done by a control handle or any other suitable means. Mounted in an opening at the rear upper portion of the vehicle top is a shutter type ventilating grid 87 the opening and closing of which may be accomplished from the interior of the vehicle. The front radiator 82 is provided with the usual overflow pipe which leads downwardly from the front radiator chamber to a suitable point to permit the overflow of water to be discharged. The overhead air chamber 83 in the vehicle affords a suitable means whereby the car may be cooled off in the summertime, while in the wintertime during cold weather the air chamber 83 may be utilized as a means for heating the interior of the car. The heating of the interior of the car may be accomplished by means of force fans positioned at selected intervals in the chamber 83 to force warm air from said chamber downwardly into the vehicle through openings in the inner top wall 85 and downwardly into the chambered body walls of the vehicle. Whenever it becomes necessary the front radiator opening may be closed and the rear ventilating mechanism 87 may be used to admit air into the wall chambers 83 to cool the radiator 82.

Figures 1 and 17 illustrate the vehicle trailer which comprises a body 88 which may be constructed of plain or corrugated metal. The front wall of the trailer body 88 is curved complemental to the curvature of the rear wall of the vehicle body 1 and is provided with a corrugated section 89 which is adapted to interfit with the corrugated rear wall 3 of the main vehicle body when the trailer is in the position illustrated in Figure 1. Pivotally mounted on each side of the trailer body 88 by means of a hinge 90 is a trailer pontoon 91 provided with a wheel chamber 92 in which a pneumatic tired wheel 93 is rotatably supported. As illustrated in Figure 17, the body of the trailer 89 is provided with upper and lower pontoon-receiving recesses or pockets for receiving the pontoons in either their lowered or raised positions. It is intended to raise and lower the pontoons 91 by cable mechanisms similar to those used in connection with operating the main pontoons 9 of the vehicle. The open top of the trailer body 89 is closed by means of hinged cover sections 94 which are arranged to be swung outwardly into open position as illustrated in Figure 17 to provide beds or bunks 95. Also adjustably mounted within the trailer housing 89 are a pair of auxiliary bunks or beds 96 which may be swung into a horizontal position for use as illustrated in Figure 17. Normally, if desired, the auxiliary bunk 96 may be sprung downwardly into and out of the way position within the trailer housing 89.

Also supported in the interior of the trailer housing 89 is one or more telescoping or collapsible poles or masts 97 which normally are adapted to be collapsed within the base section of the mast to be completely disposed within the interior of the trailer housing. When the mast 97 is extended, the same may be used for supporting a tent or cover 98 in position as illustrated in Figure 17.

When the trailer is used as a water craft, the pole or mast 97 may be used as a sail supporting mast if desired. The main body of the automarine vehicle may also be equipped with one or more of the telescoping masts 97 and when desired said masts may be projected upwardly through suitable openings in the top of the automarine vehicle to serve as supports for sails so that the automarine vehicle may be driven by the wind in case of emergency caused by engine trouble or the like.

When the trailer is used as an extension for the rear end of the vehicle as illustrated in Figure 1, or when the vehicle is used as a water craft, the trailer serves as a means for increasing the overall length of the craft. The trailer may be rigidly secured to the rear end of the vehicle body by bolts or any other suitable means. It will also be understood that when desired the trailer may be coupled to the rear end of the vehicle to be pulled along as a separate unit.

Figure 19 illustrates a cross-section of a modified form of an automarine vehicle body. In this form of body the entire walls are constructed of corrugated sheet metal and comprises a corrugated body 99 and a corrugated top 100 which are joined together along the sides of the vehicle by means of corrugated pontoons 101 which are rigidly secured in position instead of being pivotally supported as are the pontoons illustrated and described in connection with Figures 1 to 18 of the drawings. The modified form of body may be constructed of plain metal if desired.

When the automarine vehicle is used on the land it may be run with the trailer either coupled and pulled behind the automobile or secured to the automobile as illustrated in Figure 1. As a land vehicle, the pontoons are of course secured in their lowered positions as shown in Figure 1 with the vehicle resting on the wheels 12, 44 and 93. The automobile is adapted to be driven by means of the ordinary driving mechanisms of the automobile and the vehicle is steered by means of the steering wheel 103 in the usual manner.

Under normal conditions when the vehicle is to be driven on land the driver operates the control wheel 38 to longitudinally shift the main transmission shaft 29 so that the section A of the driving keys 39 (Figure 13) are shifted into locking driving engagement with the gear 40 thereby causing a drive from the vehicle engine to be transmitted to the driving gear 41 which in turn rotates the main driving shafts 42 to rotate the driving wheels 43. The driving wheels 43 are positioned above and in frictional driving contact with the traction wheels 44 causing the traction wheels to rotate to advance the vehicle or to reverse the same depending upon the position of gear shift lever 32. When the vehicle is used as a standard automobile, the same is driven by the elevated driving wheels 43 which frictionally drive the traction wheels 44. The vehicle is steered by means of the regular steering wheel 103 by which the steering wheels 12 may be adjusted.

The control wheel 38, which when rotated governs the shifting of the main transmission shaft 29, may be graduated and marked to designate the different positions into which the transmission shaft may be moved to produce different driving combinations. In the present showing of the machine the transmission shaft 29 is capable of being moved into six different positions including a neutral position which may be designated "0", a jack lowering or adjusting position "1" positioned to one side of the "0" mark for causing a forward shifting of the shaft 29 from the normal position "0" into the jack operating position. A position "2" which is the ordinary driving position of the vehicle in which the driving wheels 43 are brought into action to drive the vehicle either forwardly or rearwardly depending on the position of the gear shift lever 32. A position "3" wherein the main transmission shaft is moved rearwardly another degree to bring the "B" section of the keys 39 (Figure 13) into driving engagement with the driving gear 40 and at the same time moving the driving keys 50 into driving engagement with the driving gear or pinion 52 to cause a drive to be imparted to the gear 53 and the "caterpillar" driving means or belts 58 whereby the vehicle may be driven by either or both the driving wheels 43 or the "caterpillar" belts. Position "4" on the control wheel 38 is a combination driving position for the driving wheels 43 and the propellers 79. In this position the driving keys 39 are moved rearwardly another position to move the "C" section of the driving keys 39 into engagement with the gear 40 (Figure 13) thereby causing a drive to be imparted to the gear 41 while the keys 50 are moved through the gear 52 out of driving engagement therewith, while the driving keys 102 are moved into driving engagement with the sprocket gears 80 to cause operation of the belts 81 and rotation of the propellers 79. The fifth position marked "5" on the control wheel 38 produces a further rearward shifting of the main transmission shaft 29 into a position wherein the driving keys 39 are moved rearwardly out of engagement with the gear 40, thereby discontinuing the drive to the main driving wheels 43 while the driving keys 102 are still in driving engagement with the propeller driving sprocket gears 80 to drive the propellers 79. From the foregoing it will be noted that the main transmission shaft 29 may be moved into the various driving combination positions and into the jack lowering or raising positions as desired.

While six different positions of adjustment of the main transmission shaft 29 have been described, it will of course be understood that other combinations may be arranged by a selected arrangement of driving keys on the shaft 29 to permit the keys to be selectively moved into engagement with the various driving mechanisms or the adjusting mechanisms which are adapted to be driven from the main transmission shaft.

When the shaft 29 is moved forwardly from the neutral position into position "1" wherein the driving keys 61 are in engagement with the gear 63 (Figure 13) the shaft 29 may be rotated from the engine to cause rotation of the auxiliary screw shaft 65 to move the rollers 69 from the full line position illustrated in Figure 2 into the dotted line position illustrated wherein the lower laps of the "caterpillar" belts 58 are lowered to act as a jack which, as shown in Figure 2, is located substantially midway between the front and back of the vehicle to produce substantially a perfect balance of the machine when the jack is lowered far enough to cause the machine supporting wheels to be raised off of the ground. When the machine is jacked up as described, either one of the pontoons 9 may be swung upwardly into a raised position to permit convenient access to be had to the vehicle wheels to facilitate changing of the same or repairs if necessary.

If a situation is reached wherein the wheels of the vehicle are driven onto soft ground and cannot properly grip the ground to cause the vehicle to be advanced or reverse, the "caterpillar" belts 58 may first be lowered into a driving position as illustrated in Figure 2 after which the control wheel 38 may be rotated into the third position of adjustment of the wheel in which a combination drive of the driving wheels 43 and the drive of the "caterpillar" belts is produced. The "caterpillar" belts acting on the soft ground or on a rough or inclined surface will act to drive the vehicle into a position on better or firmer ground on which the regular driving and supporting wheels of the vehicle will take hold to permit normal driving of the vehicle. When this condition is reached, the "caterpillar" belts may be retracted or raised to their normal positions.

When the device is being used as a water craft and it is desired to drive onto the land, the pontoons are lowered from their raised positions into their lowered positions and the control wheel 38 is rotated into the combination driving position "4", wherein a combination drive to the driving wheels 43 and the drive to the propellers 79 is accomplished. With this driving combination the vehicle may be driven from the water onto the shore until the regular wheels 12 and 44 of the vehicle take hold of the shore ground to permit the vehicle to be driven by its wheels. After the vehicle has been driven onto the land the drive to the propellers 79 may be disconnected and the shaft 29 moved into position "2" wherein the drive is imparted to the driving wheels 43 and the wheels 44 for the driving of the vehicle.

In case it is desired to drive the vehicle from the land into the water, the drive combination "4" may also be employed, that is, a combination between the driving wheels and the propeller until the vehicle is sufficiently in the water to permit the same to be driven by means of the propellers 79 only. When this condition is reached, the shaft 29 may be shifted into position "5" wherein the drive to the drive wheels is disconnected and a drive is imparted only to the propellers 79.

When the automarine vehicle is used as a water craft and is propelled by means of the propellers 79, the water craft may be conveniently steered by means of the auxiliary steering wheel 77 from the driver's position of the vehicle. By rotating the auxiliary steering wheel 77 the control cables 74 which lead backwardly through the hinges 8 and are engaged around the grooved pulley 73 on the gear housing 70, cause rotatable adjustment of the gear housing 70 and the housing arms 78 to cause alternate raising and lowering of the respective propellers 79, resulting in a selective steering of the water craft. The arrangement of providing a multiple number of propellers is advantageous in that if any one of the propellers becomes broken or goes out of commission the gear housing 70 may be rotated into a position to place the remaining propeller in its lower position so that the craft may be driven by a single propeller.

Whenever it becomes necessary to raise the pontoons 9 from their lowered positions, the control rod 29 is actuated by means of a control lever at the driver's position to cause the pivoted bracket 29a to be slightly rotated to bring the bevelled discs or wheels 27 into respective frictional rolling contact with the oppositely positioned bevelled discs or wheels 28. With the two bevelled wheels 27 mounted on the single bracket 29a, it will be noted that one of the bevelled wheels 27 is moved into contact with one of the bevelled driving wheels 28 while the other bevelled wheel 27 is moved into frictional engagement with the second bevelled disc or wheel 28. Operation of the friction driven discs or wheels 27 causes rotation of the shafts 26 thereby causing rotation of the pontoon-operating shafts 23 and the cables 21 to cause the pontoons 9 to be swung upwardly from the full line positions illustrated in Figure 7 into the dotted line positions whereby the vehicle may be used as a water craft. In this raised position of the pontoons, the wheels 12 and 44 have the tires projecting outwardly from the sides of the vehicle to serve as bumpers for the craft when the same is being docked or is being guided between other crafts.

It is customary when using the vehicle as a water craft to attach the trailer to the rear end of the vehicle as illustrated in Figure 1 to increase the overall length of the vehicle, to insure greater stability of the craft. When the vehicle is used as a water craft for short distances only, as, for example, in crossing a narrow stream, the trailer need not be secured to the body of the vehicle in the manner illustrated in Figure 1 but may be towed along.

Attention is called to the novel arrangement whereby the radiator 82 is positioned in the upper front portion of the automarine vehicle top instead of at the front end of the hood as has ordinarily been the custom. The placing of the radiator 82 in the upper front portion of the vehicle top permits air to pass through the radiator and then through the air chamber 83 (Figure 2) and out through the discharge grid or exhaust shutter 87 at the upper rear portion of the vehicle top. In hot weather, the passing of the air through the top chamber 83 of the vehicle serves as a means for cooling the vehicle, while during cold weather the control shutter 87 may be closed so that the air heated by the radiator 82 may be forced downwardly through suitable openings in the inner ceiling or wall 85, by means of fans or the like, into the hollow walls of the body and into the interior of the vehicle to serve as a means for heating the same.

The main body of the vehicle and the body of the trailer may be equipped with the collapsible or telescoping posts or masts 97 and said masts may be raised as illustrated in Figure 17 to permit the same to be used for the support of supporting sails when the device is used as a water craft or for the supporting of tents or coverings such as the tent 98 when the trailer is used as a camp outfit.

In the modified form of vehicle body illustrated in Figure 19, the pontoons 101 form a rigid part of the vehicle body and may be used as a means for buoying up the vehicle to permit the same to be used as a water craft when desired. The use of corrugated sheet metal to form the body and the pontoons greatly strengthens the vehicle and furthermore serves as a convenient longitudinal run-off for the water from the front to the rear of the craft in hitting waves head on while waves which strike against the craft from the sides are broken up by the corrugations due to the irregular surface provided. The form of vehicle body shown in Figure 19 may also be constructed of plain metal if desired.

As clearly illustrated in Figure 9, the main body 1 of the vehicle and the pivoted pontoons 9 may be formed of corrugated metal if desired. The housing 49 for the "caterpillar" driving mechanisms may also be constructed of corrugated sheet metal when greater body strength is required.

It will of course be understood that various details of construction may be varied through a wide range without departing from the principles of this invention and it is therefore not the purpose to limit the patent granted hereon otherwise than necessitated by the scope of the appended claims.

I claim as my invention:

1. A land and water vehicle comprising a body, pontoons adjustably supported thereon, driving mechanisms in the pontoons, means for adjusting the pontoons, and a power transmission shaft shiftably mounted in the body for movement into selective driving engagement with the driving means in the pontoons or with the means for adjusting the pontoons.

2. An automarine vehicle comprising a body, wheels supported thereon, a power plant in the body, a propeller mechanism for operating the vehicle in water, means for adjusting the propeller mechanism to cause the same to serve as a steering means for the vehicle when in the water, a "caterpillar" mechanism in the body, a jack mechanism for adjusting the "caterpillar" mechanism to make the same serve as either a jack for raising the vehicle when on the land or as a driving means for the vehicle when the vehicle is contiguous to unsuitable supporting material, and a power transmission shaft in the body shiftable into different positions for selectively transmitting a drive to the propeller mechanism, the "caterpillar" mechanism and the jack mechanism.

3. An automarine vehicle comprising a body, a power unit therein, driving mechanisms for operating the vehicle on land, a plurality of propeller mechanisms for driving the vehicle in water, a rotatable support for the propeller mechanisms, a transmission shaft in the body connected with the power unit and shiftable into selected positions of adjustment for transmitting a drive to the land drive mechanisms and to the propeller mechanisms, and control means for rotatably adjusting the propeller mechanism support to cause the propeller mechanisms to serve as a steering means for the vehicle.

4. An automarine vehicle comprising a body, a power transmission shaft shiftably mounted therein, a plurality of propeller mechanisms for driving the vehicle in water, a rotatable support for the propeller mechanisms, means in the propeller support for rotating the propellers, a control mechanism for shifting the transmission shaft into operating engagement with the propeller rotating means in the propeller support, and a control mechanism operated from the driver's position of the vehicle for rotating the propeller support to change the position of the propeller mechanisms to cause the same to serve as a steering means for the vehicle when in the water.

5. An automarine vehicle comprising a body, a plurality of driving mechanisms for driving the vehicle on land or in the water, and a power transmission shaft in the body selectively shiftable into different positions for selectively connecting up the driving mechanisms for driving the vehicle on the land or in the water or between the land and water.

6. An automarine vehicle comprising a housing, a plurality of driving mechanisms for driving the vehicle on land and in the water, a "caterpillar" driving mechanism for driving the vehicle from the water onto the land or from the land into the water, a power transmission shaft shiftably mounted in the body, and means for selectively shifting the power transmission shaft into selective driving engagement with the land and water driving mechanisms and with the "caterpillar" driving mechanism to connect said mechanisms up individually or in group relations as desired.

7. An automarine vehicle comprising a body, a land driving mechanism therein, a water driving mechanism in the body, a "caterpillar" driving mechanism for driving the vehicle between the land and water, a jack mechanism for adjusting the "caterpillar" driving mechanism, pontoons adjustably mounted on the body, means for adjusting the pontoons to vary the draft of the vehicle when in the water, a power transmission shaft shiftably mounted in the body, means on the transmission shaft for coacting engagement with the various driving mechanisms and the adjusting mechanisms and means, and a control mechanism for selectively shifting the transmission shaft for selectively connecting up the driving mechanisms and the adjusting means individually and in groups.

8. An automarine vehicle comprising a body, wheels for supporting the same on land, a plurality of driving mechanisms for driving the vehicle on land and in the water and between the land and water, a power unit in the body, a power transmission shaft slidably mounted in the body and having a slidable connection with the power unit to receive a drive therefrom, means for longitudinally shifting the power transmission shaft into various selected driving positions, and means on the transmission shaft for coaction with the respective driving mechanisms to operate said driving mechanisms independently or in groups depending upon the relative shifted positions of the power transmission shaft.

9. An automarine vehicle comprising a body, a power unit therein, a power transmission shaft longitudinally shiftable in the body and having sliding engagement with the power unit to receive a drive therefrom, means for shifting the power transmission shaft into different driving positions, a land driving mechanism for the vehicle, a water driving mechanism for said vehicle, a "caterpillar" driving mechanism for the vehicle for driving the same between the land and water, and means on the power transmission shaft selectively movable into driving engagement with the land driving mechanism, the water driving mechanism, and the "caterpillar" driving mechanism to drive said mechanisms independently of one another or in groups depending upon the shifted driving positions of the power transmission shaft.

10. In an automarine vehicle of the class described the combination with a body, of a power unit therein, a power transmission shaft shiftably mounted in the body, and connected with the power unit to receive a drive therefrom, a "caterpillar" driving mechanism for the vehicle, means for operating the "caterpillar" driving mechanism, driving members on the transmission shaft shiftable into driving engagement with the driving means for the "caterpillar" mechanism to cause the same to be driven from the power unit, a jack mechanism and additional members on the driving shaft for driving engagement with the jack mechanism to operate the same from the transmisison shaft to cause the jack mechanism to lower the "caterpillar" driving mechanism into position for use.

11. An automarine vehicle comprising a body, a driving unit therein, a power transmission shaft shiftably mounted in the body and having slidable driving engagement with the power unit to receive a drive therefrom, a plurality of sets of driving keys arranged at spaced intervals on the transmission shaft, and a plurality of vehicle driving mechanisms and adjusting mechanisms in the body each provided with slotted means for receiving the respective sets of driving keys for selectively causing operation of the various driving mechanisms and the adjusting mechanisms with the selective shifting movements of the power transmission shaft.

12. In an automarine vehicle the combination with a body, of a power unit therein, a plurality of mechanisms to be driven from the power unit, a power transmission shaft shiftably mounted in the body and having slidable driving engagement with the power unit, a plurality of groups of driving members on the power transmission shaft and means for shiftably moving the power transmission shaft and the groups of members selectively into driving engagement with said mechanisms.

13. In an automarine vehicle of the class described the combination with a body, of a power unit therein, a power transmission shaft connected with the power unit and longitudinally shiftable in the body, a plurality of mechanisms in the body for driving and adjusting different parts of the vehicle, and means on the transmission shaft selectively movable into driving engagement with said mechanisms to selectively operate the same individually or in groups depending upon the adjustment of the power transmission shaft.

14. In an automarine vehicle of the class described the combination with a body, of a plurality of driving and operating mechanisms forming a part thereof, a power transmission shaft adjustably mounted in the body, means thereon for interfitting engagement with said mechanisms to drive the same from the transmission shaft, and means for selectively shifting the transmission shaft in the body into different driving positions to drive said mechanisms independently of one another or in groups.

15. In an automarine vehicle of the class described the combination with a body, of a power transmission shaft shiftably mounted therein, a plurality of longitudinally spaced groups of driving teeth on said transmission shaft, a plurality of adjusting mechanisms and driving mechanisms forming a part of the vehicle and each including slotted means, and means for selectively moving the driving teeth into driving engagement with the slotted means of the adjusting mechanisms and the driving mechanisms of the vehicle.

16. An automarine vehicle comprising a body, a power unit therein, a power transmission shaft shiftably mounted in the body and connected with the power unit to receive a drive therefrom, a propeller mechanism for driving the vehicle in the water, means for shifting the transmission shaft into and out of engagement with the propeller mechanism, a rotatable support for the propeller mechanism, and means connected with the propeller mechanism and operable from the driver's position of the vehicle to adjust the propeller mechanism to make the same serve as a steering means for the vehicle when in the water as well as a propelling mechanism.

17. An automarine vehicle comprising a body, pontoons adjustably mounted thereon, means for adjusting the pontoons, a driving mechanism in the body for operating said pontoon adjusting means, steering wheels in the pontoons, main driving wheels in the body operable from the driving mechanism and pairs of auxiliary driving wheels in the pontoons normally positioned in frictional driving contact with the main driving wheels to be driven thereby.

18. An automarine vehicle comprising a body, a driving device therein, driving wheels mounted within the body for receiving a drive from said driving means, pontoons adjustably mounted on the body, auxiliary driving wheels in the pontoons in frictional contact with the main driving wheels to be frictionally driven thereby, steering wheels in the pontoons, and control means in the body for adjusting the steering wheels for steering the vehicle when used on the land.

19. An automarine vehicle comprising a body, pontoons mounted thereon, steering wheels in the pontoons, a steering mechanism in the body for adjusting the steering wheels, main driving wheels in the body, auxiliary driving wheels in the pontoons and in frictional engagement with the main driving wheels to be frictionally driven thereby, and power means in the body for driving the main driving wheels.

ALBERT E. COOK.